United States Patent
Stuller et al.

[15] 3,666,034
[45] May 30, 1972

[54] HYDROSTATIC VEHICLE—FOUR-WHEEL DRIVE, FOUR-WHEEL STEERING

[72] Inventors: Howard E. Stuller; Jerry D. Baker, both of Lubbock, Tex.

[73] Assignee: Clark Equipment Company

[22] Filed: Oct. 24, 1969

[21] Appl. No.: 869,211

[52] U.S. Cl. ..................180/6.48, 180/45, 180/79.2 C, 280/91
[51] Int. Cl. ......................................B62d 11/04
[58] Field of Search .............180/6.48, 6.5, 45, 46, 79.2 R, 180/79.2 C; 280/91

[56] References Cited

UNITED STATES PATENTS

| 2,358,236 | 9/1944 | Lee | 280/91 |
| 3,064,745 | 11/1962 | Colt et al. | 180/6.48 X |
| 3,081,883 | 3/1963 | Minty | 180/6.48 X |
| 3,323,607 | 6/1967 | Futamata | 180/6.48 |

FOREIGN PATENTS OR APPLICATIONS

| 237,675 | 2/1962 | Australia | 180/45 |
| 127,144 | 6/1959 | U.S.S.R. | 180/46 |

Primary Examiner—Kenneth H. Betts
Assistant Examiner—John A. Pekar
Attorney—Paul A. Gallagher

[57] ABSTRACT

A vehicle having an independent drive motor for each wheel, the wheels being positionable to either a straight fore-and-aft position or angular position; in a straight position, turning is done by differential in the speed between the outer and the inner wheels; when the wheels are in angular position, the wheels can spin-turn in either direction about an internal vertical axis.

14 Claims, 5 Drawing Figures

INVENTORS
HOWARD E. STULLER
JERRY D. BAKER
BY
PAUL H. GALLAGHER
ATTORNEY

Patented May 30, 1972

INVENTORS
HOWARD E. STULLER
JERRY D. BAKER

BY

PAUL H. GALLAGHER

ATTORNEY

SEE ALSO FIGS. 5F-5J

INVENTORS
HOWARD E. STULLER
JERRY D. BAKER
BY
PAUL H. GALLAGHER
ATTORNEY

Patented May 30, 1972

SEE ALSO FIGS. 5A-5E

F

G

H

I

J

*INVENTORS*
HOWARD E. STULLER
JERRY D. BAKER
BY

PAUL H. GALLAGHER

ATTORNEY

HYDROSTATIC VEHICLE—FOUR-WHEEL DRIVE, FOUR-WHEEL STEERING

OBJECTS OF THE INVENTION

A broad object of the invention is to provide a hydrostatically operated vehicle having novel drive and steering means.

Another object is to provide a vehicle of the kind referred to having all-wheel driving and steering arrangement, wherein the steering is accomplished by either differential in speed between the outer and inner wheels or positioning the wheels in different directions.

A further object is to provide a vehicle of the character referred to in which the wheels are positionable in different positions, in one of which the wheels are all in straight fore-and-aft position, and in such straight position the steering is accomplished by differential in speed in the outer and inner wheels in the same direction, or alternatively by driving the outer and inner wheels relatively reversely.

A still further object is to provide a vehicle of the foregoing general character in which the wheels are positionable alternatively in straight fore-and-aft position and angular position, and when they are in angular position the vehicle can spin-turn in either direction about an internal vertical axis.

Another and broad object of the invention is to provide a vehicle of the foregoing general character which can be readily and easily changed from any position or attitude of driving/steering to any other position or attitude of driving/steering, without stopping the vehicle.

Still another object is to provide a vehicle of the foregoing general character in which the driving and steering steps are controlled by a single control member.

An additional object is to provide a vehicle of the foregoing general character in which all of the driving and steering functions are accomplished hydrostatically.

A further object is to provide a novel method of driving and steering a vehicle by the use of hydrostatics.

DESCRIPTION OF A PREFERRED EMBODIMENT

Figure 1:
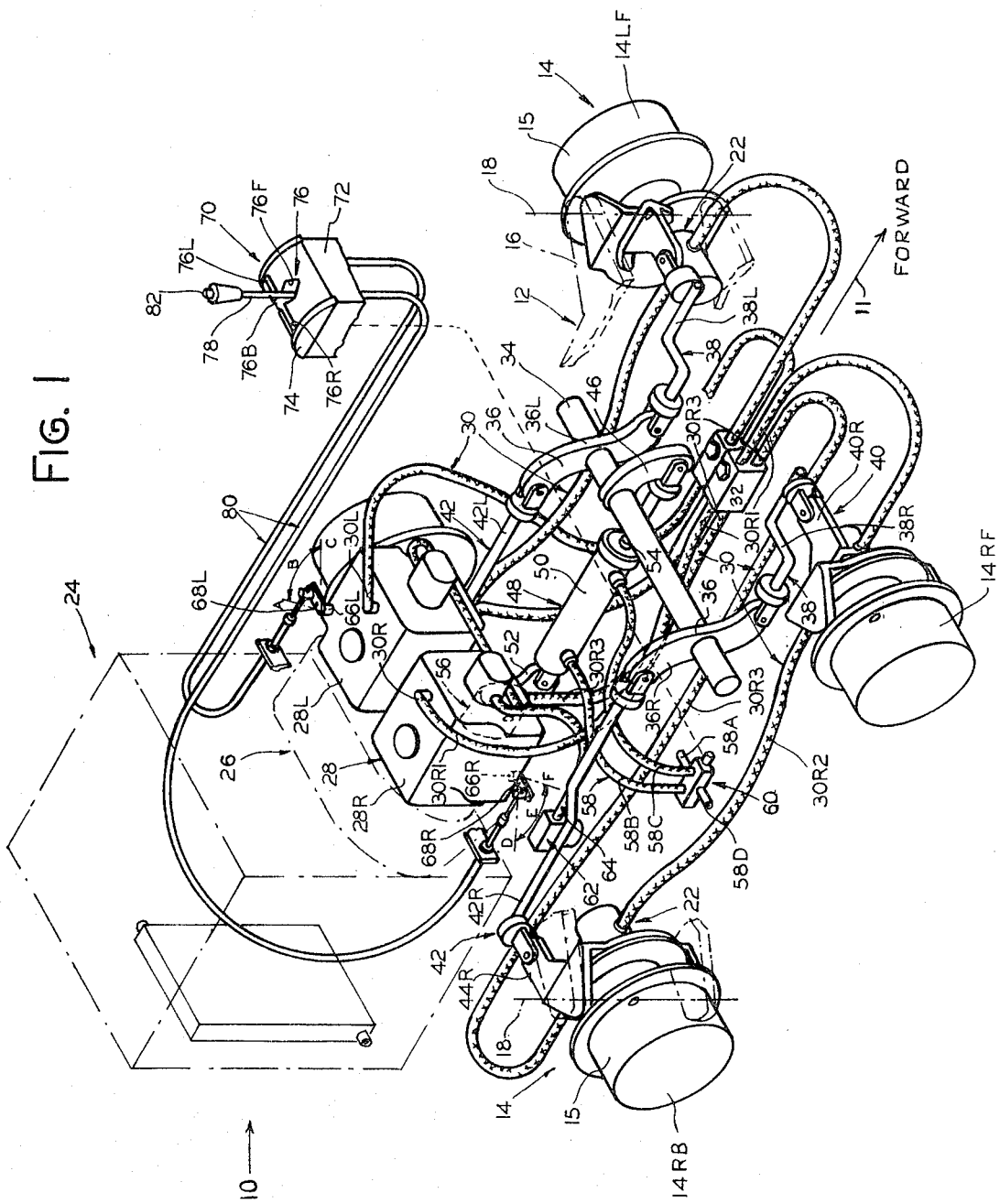
FIG. 1 is a perspective view of the moving and operating parts of the vehicle.
Figure 2:
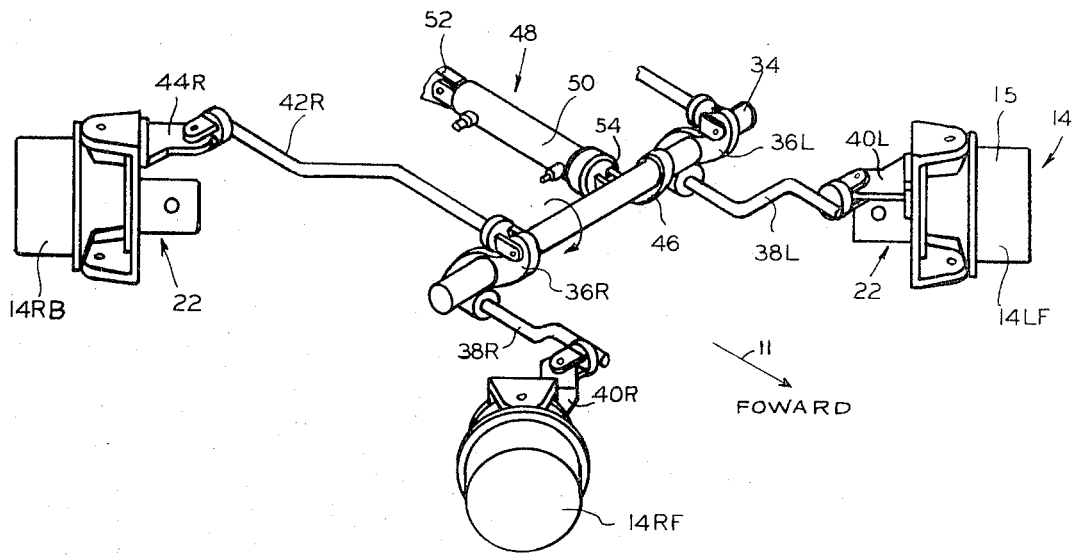
FIG. 2 is a perspective view of a portion of the elements included in FIG. 1, and showing the wheels in angular position, and related elements in corresponding alternate positions relative to FIG. 1.
Figure 3:
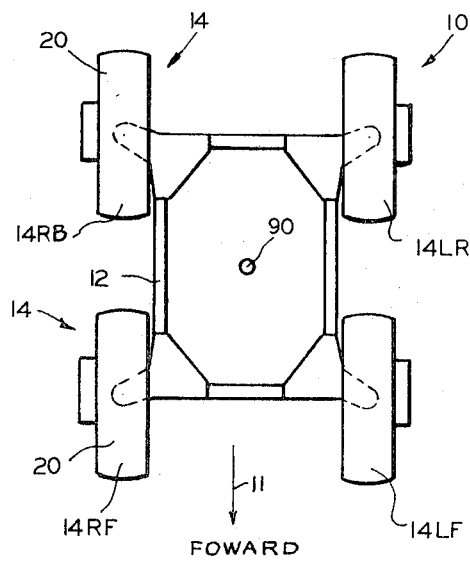
FIG. 3 is a plan view of the frame and wheels of the vehicle, showing the wheels in straight fore-and-aft position.

Referring in detail to the drawings, FIG. 1 shows in perspective view substantially all of the moving and operating parts of the vehicle, while FIG. 3 shows only the frame and the wheels. The vehicle is oriented with its front end directed downwardly and to the right in FIGS. 1 and 2, and downwardly in FIGS. 3 and 4, forward direction being indicated by the arrow 11.

The vehicle represented in the drawings may be for example, a loader, but the details of that feature do not enter into the present invention. The vehicle as a whole is indicated at 10 and includes a frame 12 having ground engaging wheels 14, in the present case four in number, and the frame is of suitable dimensions and proportions, in the present instance only slightly longer in fore-and-aft direction than it is wide.

The wheels in themselves are of conventional construction each including a planetary unit 15, and are suitably mounted in brackets 16 forming a part of or secured to the frame 12. The wheels are mounted for pivotal swinging movement about king pins represented by vertical axes 18 extending diametrically through the center of the tires 20 on the wheels.

Each wheel 14 incorporates a hydraulic drive motor, indicated at 22 and also of conventional construction, the details of which need not be entered into. Upon swinging movement of the wheels, the drive motors therein remain fixed relative to the wheels and also swing about the vertical axes 18.

The motive power for the vehicle is derived from a power unit 24 of suitable and known kind, such as an internal combustion engine, and operatively associated therewith is pump drive gear box 26, itself operatively associated with pump means made up of a pair of infinitely variable displacement transmission pumps 28. These pumps may be of duplicate construction, and each is related to the pair of wheels on one of the sides of the vehicle.

For convenience the wheels are individually identified as to right and left and front and back (rear) such as 14RF (right, front) 14RB, 14LF, 14LB, and the pumps 28 are correspondingly identified 28R and 28L.

The arrangement includes flexible fluid lines indicated as a whole at 30 for driving the wheels by the pumps. Preferably the two wheels on each side of the vehicle are connected in series with the respective pump, i.e., the two right wheels 14RF and 14RB are connected in one fluid line circuit 30R with the pump 28R while the wheels 14LF and 14LB are connected in another fluid line circuit 30L with the other pump 28L. The fluid line circuit 30R includes a first line section 30R1 connected with the outlet of the pump, supported in a mounting block 32, and leading to the hydraulic drive motor in the wheel 14RF from which another line section 30R2 leads to the drive motor in the wheel 14RB; another line section 30R3 leads from the latter motor and again through the mounting block 32 to the return side of the pump 28R.

The other fluid line circuit 30L includes corresponding line sections connected to the respective pump and drive motors on the left hand side in the manner described in connection with the right hand line circuit.

Figure 4:
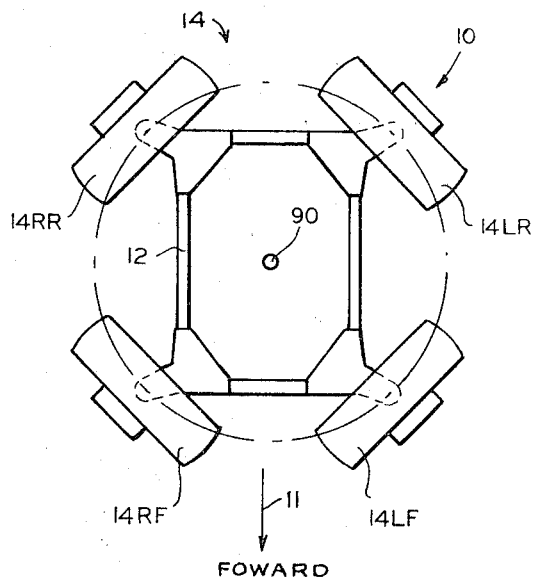
FIG. 4 is a view similar to FIG. 3 but with the wheels in angular position.

The arrangement includes means for shifting the wheels between two positions, namely straight fore-and-aft direction represented in FIGS. 1 and 3 and angular position represented in FIGS. 2 and 4. This means includes a transverse rock shaft 34 suitably mounted in the frame and including a pair of double ended lever arms 36 individually identified 36R and 36L, these lever arms being fixed to the shaft for swinging movement upon rocking of the shaft. Pivotally connected to one end of the lever arms, e.g., the lower ends, are forwardly extending rods 38R, 38L, the forward ends of which are pivotally secured to inwardly extending arms 40R and 40L fixedly incorporated in the corresponding wheels 14RF, 14LF. Pivotally secured to the other ends of the lever arms 36 are rearwardly extending rods 42, the rear ends of which are pivotally secured to inwardly extending arms 44R, 44L in the corresponding rear wheels.

Fixedly mounted on the transverse rock shaft 34 is a crank arm 46, pivotally secured to the extended end of which is a hydraulic jack 48 including a cylinder 50 mounted at one end on a fixed element 52 and a piston having a rod 54 directly pivotally mounted on the crank arm. The arrangement includes an implement pump 56 for operating the jack and flexible hydraulic lines 58 interconnecting that pump and the cylinder. These lines include an inlet line 58A leading from the pump to electrically controlled valve means 60, and branch lines 58B, 58C leading from the valve means to the cylinder on respectively opposite sides of the piston. An outlet line 58D leads from the valve 60 to a tank (not shown), this arrangement being of known kind. The illustration also includes a filter means 62 and associated suction lines 64, which do not enter into the present invention.

The pumps 28 incorporate control means, which in themselves are not shown but indicated at 66R, 66L represented by respective lever arms 68R, 68L swingable throughout an angular range indicated. They each have a central neutral position and outer extreme positions on opposite sides of that neutral position. For example in the case of the lever arm 68R its neutral position is indicated at E, one extreme side position at D and the opposite one at F; in the case of the lever arm 68L its neutral position is indicated at B and its extreme opposite positions at A and C. It will be understood that in movement of the lever arms to the different positions the pump control means to which they are connected are moved to corresponding control positions.

A control unit or box 70 is provided which in its broad aspects may be of known kind, except that it includes means for performing certain specific functions referred to in detail hereinbelow. The unit 70 includes a suitable box or enclosing cabinet 72 having a top cover plate 74 provided with a slot 76 through which a joy stick or control arm 78 extends. The slot 76 has a certain predetermined pattern including diamond shaped portions 76F, 76B (forward and backward or rearward) and narrow side portions 76R, 76L. The joy stick is moved in the respective directions, e.g., forward, right, etc. for driving and steering in those corresponding directions. Operatively connected between the control unit 70 and the lever arms 68 are suitable motion transmitting means such as bowdin wires 80, of known kind and mounted in a known manner. The joy stick 78 includes a pushbutton 82 operative for controlling the valve 60 for in turn controlling the hydraulic jack 48.

The vehicle wheels 14, as noted above, have a normal straight fore-and-aft position as represented in FIGS. 1 and 3, and in this position the jack 48 is extended to the position shown in FIG. 1. To place the wheels in this position, fluid pressure is exerted through the line 58B for positively extending the piston and rocking the rock shaft 34; to move the wheels to angular position, the fluid pressure is exerted through the other line 58C to positively retract the piston and rock the rock shaft to the position shown in FIG. 2. This rocking movement draws on the rods 38, 42 and swings the wheels to their angular position. Suitable stop means are provided for limiting the wheels to their respective positions just referred to. The control of the valve 60 and the jack 48 by the push button 82 in the joy stick will be described hereinbelow.

Figure 5:
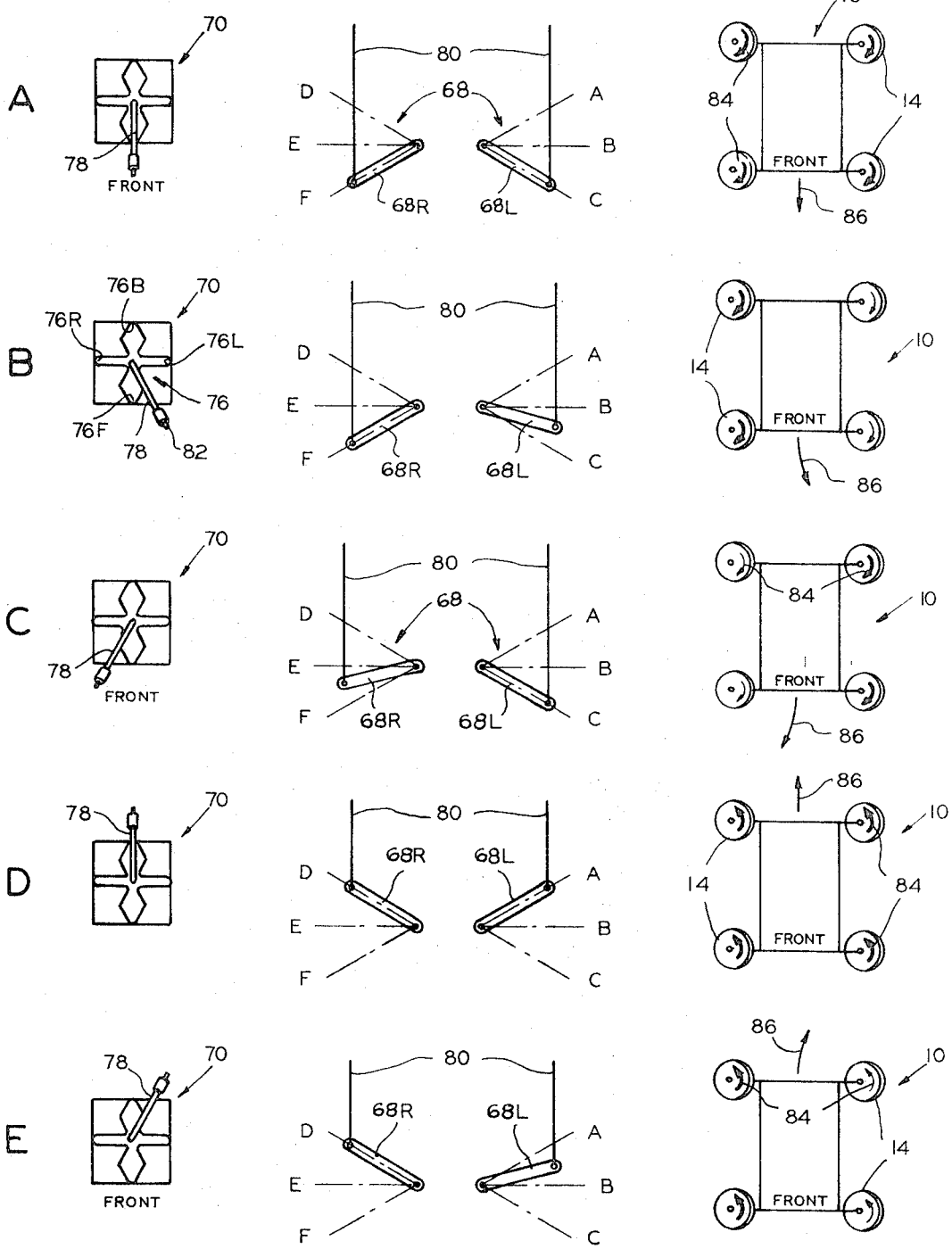
FIG. 5 is a series of sketches diagrammatically showing the control means in different positions corresponding to the respective ones of the control functions in a driving and steering of the vehicle.
Figure 5:
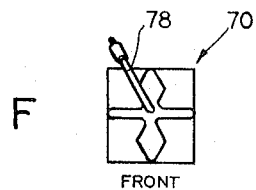
Figure 5:
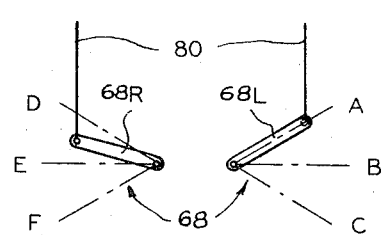
Figure 5:
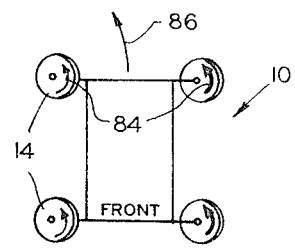
Figure 5:
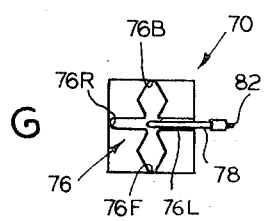
Figure 5:
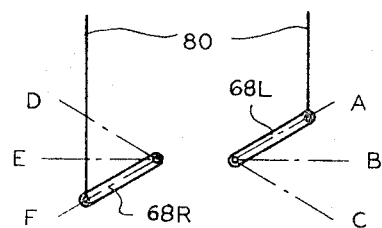
Figure 5:
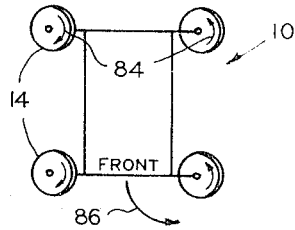
Figure 5:
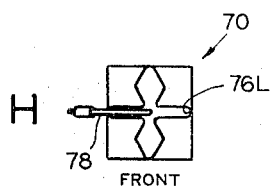
Figure 5:
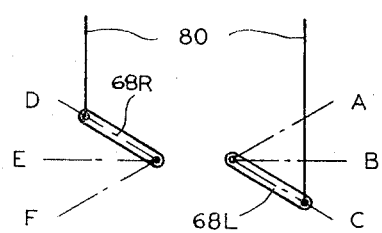
Figure 5:
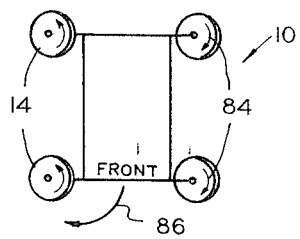
Figure 5:
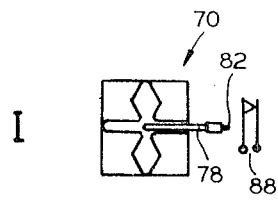
Figure 5:
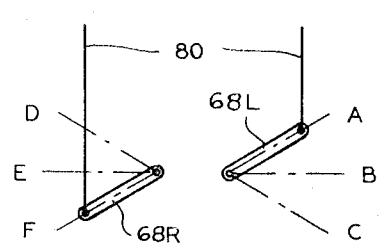
Figure 5:
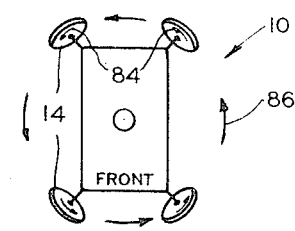
Figure 5:
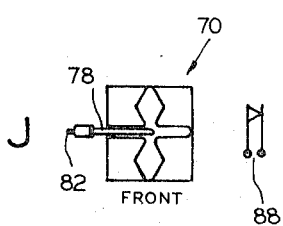
Figure 5:
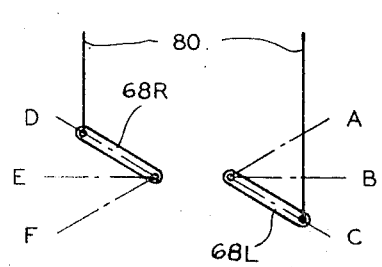
Figure 5:
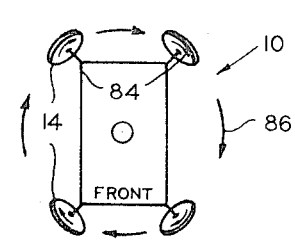

Attention is next directed to FIG. 5 showing diagrammatically the different positions of the joy stick, and of the push button therein in the various positions thereof, in the control operations, and the positions of the wheels and indications of the directions of rotation thereof. This figure shows the different possible steps in the operation of the vehicle. In consideration of this figure, attention is also directed to the control of the pumps 28 and particularly the lever arms 68 therein, and the references thereto hereinabove. For example, in the neutral positions represented by the letters B and E, there is no transmission of fluid from the pumps and the vehicle is stationary. When the lever arms are displaced or moved from neutral positions toward their extreme positions, e.g., to positions A and D in one direction and positions C and F in the other direction, fluid is pumped and the wheels are rotated. As an example, and in the present case, when the lever arms are moved toward the positions A and D, the wheels are rotated reversely for moving the vehicle backward and on the other hand when they are moved in the other direction towards the positions C and F, the wheels are rotated in the opposite direction or forwardly. As noted above, the pumps are of infinitely variable character, and the positions noted namely, A, D and C, F, are the extreme positions in which the maximum speeds in the corresponding directions are attained, but if the levers are moved only partially toward those positions, rotation of the wheels in the same directions is produced, but at proportionally lesser speeds.

The diagrammatic presentation in FIG. 5 includes the control unit 70, the control lever arms 68 of the pumps 28, the control lines or bowdin wires 80 and the vehicle 10, and the panels A–J inclusive represent the different steps or functions in the operation of the vehicle. The wheels 14 of the vehicle are provided with arrows 84 to indicate their direction of rotation in the various steps. These arrows are respectively heavy and light, the heavy arrows indicating greater speed and the lighter arrows indicating lesser speed. In certain cases e.g., panels G, H, I and J, the arrows are all of the same weight since in these instances the function represented (steering) is accomplished by different direction of rotation of the wheels, and the speed of rotation of all the wheels is normally the same, but the feature of differential in speed of rotation is not to be precluded. The specific linkage or interconnecting means provided between the joy stick and the bowdin wires 80 for actuating the latter, and thus the lever arms 68, may be of suitable kind as desired, and it is believed not necessary to enter into the details thereof.

In any direction of movement of the joy stick 78 the speed of rotation of the wheels is varied proportionately as the joy stick is moved from its central neutral position toward its extreme position in any direction.

In all of the illustrations 5A–5H, the wheels are in straight fore-and-aft position as represented in FIG. 3, this position being assumed when the pushbutton 82 in the joy stick is released or not depressed.

In FIG. 5A, the joy stick is moved forward which throws the lever arms 68 forwardly to the extreme positions F and C, and hence the maximum flow of fluid is transmitted to all the wheels which are rotated at maximum speed, all at the same rate. The straight movement of the vehicle is indicated by the straight arrow 86.

In FIG. 5B, the joy stick is thrown to one side of the diamond shaped slot 76F, in this case to the left, and in such position the lever arm 68R remains in its extreme forward position F while the other lever arm 68L is moved to a position intermediate the positions C and B, resulting in maximum forward speed of the right hand wheels and lesser speed of the left hand wheels, as indicated by respective heavy and light arrows 84. As a result, the vehicle turns to the left in a skid-turn, as indicated in left broad-curve arrow 86. In this turn, the inner wheels or left hand wheels, one or both, may skid, while the outer wheels or right hand wheels may spin, or there may be both skidding and spinning.

In FIG. 5C, the situation is the same as in FIG. 5B, but opposite; the joy stick is thrown to the right in its forward position and in this case the lever arm 68L is in its forward position C while the right hand lever arm 68R is between the positions E and F, resulting in greater speed of the left hand wheels than the right hand wheels, and consequent turning to the left.

FIGS. 5D, 5E, and 5F correspond respectively with FIGS. 5A, 5B, and 5C except that the vehicle is moving rearwardly instead of forwardly. All actions and functions are the same except in reverse direction, or relatively reverse directions, the turning movements in this case also being indicated by the arrows 86, and being respectively straight, curved broadly to the right, and curved broadly to the left.

The turning movements of the vehicle in FIGS. 5B, 5C and 5E, 5F, may be identified as moderate skid-turns, since all of the wheels are rotating in the same direction, but at different rates; however the vehicle is also capable of a full-skid turn, which is represented in FIGS. 5G and 5H, where the wheels on the right and left hand sides respectively are rotated in opposite directions. In the former cases, namely, FIGS. 5B, 5C and 5E, 5F, the arrows 86 indicate a broad turn while in the case of FIG. 5G, 5H the arrows 86 indicate an abrupt turn.

Referring to FIG. 5G the joy stick is thrown to the left into the slot 76L and in such case the lever arm 68R is thrown to its full forward position F while the other lever arm 68L is thrown to its full back position A, and in such case the right hand wheels of the vehicle are rotated forwardly while the left hand wheels are rotated rearwardly. There need be no differential in speed as between wheels. The relative forward and reverse movement of the right and left hand wheels produces a quick turn of the vehicle, but there is skidding or spinning, or both. In the case represented in FIG. 5H, the situation is the same as in 5G, but reversed; the joy stick is thrown to the right, the lever arm 68R is thrown to its full reverse position D while the lever arm 68L is thrown to its full forward position C and the wheels of the vehicle are correspondingly rotated. In this condition the vehicle takes an abrupt turn to the right.

FIGS. 5I, 5J represent what is identified as a spin-turn. In this case the pushbutton 82 in the joy stick is depressed which actuates suitable means such as an electric switch 88 which through suitable control means, actuates the valve 60 and therethrough the jack 48. As indicated above, when the pushbutton is released, the jack is disposed in its extended position as represented in FIG. 1 and the wheels are positioned straight as in FIGS. 1, 3 and 5A to 5H, but upon depression of the pushbutton and actuation of the switch 88, the jack is thrown to its contracted position to move the wheels to their angular position represented in FIGS. 2, 4, 5I and 5J. With the pushbutton depressed and the joy stick thrown to the left as represented in FIG. 5I and the wheels in angular position, the wheels on the right hand and on the left hand sides are respectively rotated forwardly and rearwardly (the same as in FIG. 5G), but since the wheels are disposed at an angle, they all rotate in the same direction as considered from viewing them from a position outwardly therebeyond, along their axes toward the central internal axis 90. Hence the vehicle spin-turns about the central axis 90 in counter clockwise direction as indicated by the arrows 86 and does so while remaining in position, i.e., it does not move out of its dimensional limits in its rotation.

FIG. 5J represents the same situation as in 5I except the opposite; the joy stick is thrown to the right, with the pushbutton of course depressed, and the lever arms 68 are thrown to their positions respectively opposite those shown in FIG. 5I, and while the wheels remain in, or are again in, their angular position, their directions of rotation are opposite that of FIG. 5I; consequently the direction of spin-turning is clockwise or opposite that of FIG. 5I.

A great advantage of the invention is that the vehicle can be moved to any position or attitude from any other position or attitude, without stopping the vehicle. For example, assuming the vehicle is moving straight forward, the operator may shift the joy stick to the left for example as in FIG. 5B and the vehicle will immediately turn to the left without any of the wheels coming to a stop and of course without the vehicle coming to a stop. The same is true if it is desired to turn to the right, and similarly in either of those directions while traveling to the rear. Additionally, if it is desired to move to a full spin-turn movement, the joy stick can be thrown for example, to the left as in FIG. 5G without bringing the vehicle to a stop, and in this case the right hand or outside wheels will continue turning, perhaps at the same speed and possibly at a greater speed while the left hand or inside wheels will be stopped and immediately reversed in direction, producing the full skid-turn. The same is true except in the opposite direction in the case represented in FIG. 5H.

Additionally, if the vehicle is already in motion and it is desired to go into a spin-turn while the vehicle is in motion, this may be done easily and quickly by depressing the pushbutton and throwing the joy stick to either side in the straight slots 76R, 76L. Furthermore, the vehicle may be taken out of the full spin-turn while it is actually performing that turn, by straightening the wheels and moving the joy stick to the desired position for other kind of movement, forward, reverse, etc., without bringing the vehicle to a stop. Thus the vehicle is extremely flexible, being capable of being moved in any direction and at any speed within a wide range without stopping the vehicle, with consequent efficiency.

An additional advantage resides in the flexibility in operation provided by the all-hydraulic operation, i.e., the hydrostatic drive of the wheels and the use of the hydraulic jack for shifting the wheels between the straight fore-and-aft and angular positions, and further, the control of these functions by a single control member.

We claim: 1. A hydrostatic vehicle of the character disclosed comprising a frame, ground engaging wheels mounted on the frame and swingable about vertical axis between a straight fore-and-aft position and angular positions in which they are arranged in a track on a common circle concentric with a vertical axis internal to the outer dimensions of the vehicle, a power unit, a variable displacement transmission hydraulic pump associated with each the right hand side and the left hand side of the vehicle, a hydraulic drive motor in each wheel, a hydraulic circuit operatively connected between the right hand pump and the associated right hand wheels, a hydraulic circuit connected between the left hand pump and the left hand wheels, linkage means connected with the wheels and when operated operative for shifting the wheels between their two said positions, a hydraulic jack operatively connected with the linkage means, pump means operatively interconnected between the power unit and the jack, a control unit operatively connected with the pump means and including a member movable between a central neutral position in each of a plurality of directions therefrom for effecting rotation of the wheels in directions corresponding with the direction of movement of the member and at rates of speed corresponding to the extent of movement of the member in any of its said directions, and operative for effecting differential in rates of speed between the wheels on the opposite sides of the vehicle, and further operative for effecting shifting of the wheels between their said positions.

2. A hydrostatic vehicle comprising,
ground engaging wheels adjustably movable between straight fore-and-aft position and angular position,
hydrostatic motor means for adjustably moving the wheels between their said positions,
hydrostatic motor means for driving the wheels,
power means for driving the motor means, and
control means for controlling the power means and the motor means, comprising,
a control unit including a casing,
a lever arm pivoted in the casing and extending therefrom,
the casing having slots receiving the lever arm and controlling the movements thereof in forward, reverse and side movements,
means operative in response to forward and reverse movements of the lever arm for correspondingly energizing the motor means for driving all the wheels together in forward and reverse directions, and
means operative in response to side movements of the lever arm for correspondingly changing the direction of drive of the wheels on opposite sides of the vehicle in opposite directions.

3. A hydrostatic vehicle according to claim 2 wherein the slots have terminal edge elements engageable by the lever arm and thereby predetermining the limits of movement of the lever arm and corresponding control functions relative to (a) driving all the wheels together in forward and reverse direction, and (b) changing the direction of the drive of the wheels in opposite sides in opposite direction.

4. A hydrostatic vehicle according to claim 3 wherein the side slots are straight and control the direction of drive of the wheels with respect to opposite sides of the vehicle and also the differential in speed in the wheels on opposite sides.

5. A hydrostatic vehicle according to claim 2 wherein said slots include longitudinal slots and side slots, the longitudinal slots determine the forward and reverse directions of movement of all of the wheels together and the side slots determining the direction of drive of the wheels in opposite directions relative to opposite sides of the vehicle, and the longitudinal slots include transversely enlarged portions enabling limited movement of the lever arm in sidewise directions therein.

6. A hydrostatic vehicle according to claim 5 wherein the longitudinal slots are roughly diamond shape providing shoulders facing diagonally toward the central position of the lever whereby to enable the operator to sense lateral positions of the lever within the longitudinal slots by sensing those shoulders and thereby more easily controlling the position of the lever.

7. A hydrostatic vehicle comprising,
ground engaging wheels adjustably movable between straight fore-and-aft position and angular position,
first hydrostatic motor means for adjustably moving the wheels between their different said positions, second hydrostatic motor means for driving the wheels,
power means for driving the motor means,
first control means for controlling the first hydrostatic motor means and thereby alternatively and selectively positioning the wheels in their different set positions,
second control means for controlling the second hydrostatic motor means and thereby driving the wheels,
and a single manually manipulable control member including a main element operatively connected with the second hydrostatic motor means and upon manipulation thereof operative for controlling that motor means for selectively driving the wheels on opposite sides, and for selectively so in opposite directions, and a second element carried by the main element operatively connected with the first hydrostatic motor means and upon manipulation thereof operative for controlling that motor means.

8. A hydrostatic vehicle according to claim 7 wherein the second hydrostatic motor means includes a pair of units one related to the wheels on each side of the vehicle, and the single manually manipulable member is operative for selectively controlling the units of the second control member for thereby correspondingly driving the wheels on the respective sides of the vehicle.

9. A hydrostatic vehicle according to claim 7 wherein the first hydrostatic motor means includes hydrostatic jack means operatively movable between extended and retracted limit positions, and the vehicle includes linkage operatively interconnecting the jack means and the wheels for moving the wheels to their different positions pursuant to movement of the jack means to its extended and retracted limit positions.

10. A hydrostatic vehicle according to claim 9 wherein when the wheels are in angular position, they are disposed in a common circle about a vertical axis internal to the vehicle, and the single manually manipulable member is operative for selectively controlling the units of second hydrostatic motor means for driving the wheels on the respective sides in opposite directions, and when the wheels are so angle and so driven, all of them move in a common direction relative to external viewpoint toward said internal vertical axis.

11. A hydrostatic vehicle according to claim 7 wherein the first element is a lever swingable to different positions and the second element includes a push button on the lever, and the control means includes means responsive to swinging movements of the lever for controlling the drive of the wheels respectively in direction and speed, and means is included responsive to the actuation of the push button for moving the wheels between straight fore-and-aft position and angular position.

12. A hydrostatic vehicle comprising,
ground engaging wheels adjustably movable between straight fore-and-aft position and angular position,
first hydrostatic motor means for adjustably moving the wheels between their different said positions,
second hydrostatic motor means for driving the wheels,
power means for driving the motor means,
linkage operative interconnecting the first hydrostatic motor means and the wheels including a single rock shaft, and links interconnecting each end of the rock shaft and the wheels on corresponding sides of the vehicle.

13. A hydrostatic vehicle according to claim 12 wherein double-ended lever arms are mounted on the ends of the rock shaft, the links are pivotally connected to the ends of the lever arms, a crank arm is mounted on the rock shaft, and the first hydrostatic motor means includes a hydrostatic jack pivotally connected to the crank arm.

14. A hydrostatic vehicle according to claim 13 wherein the second hydrostatic motor means includes a motor mounted in each wheel and movable therewith in the movement of the wheels between their said positions, the hydrostatic jack is extensible/contractible to limit positions, and the jack, crank arm and lever arms are so constructed and arranged that when the jack is in one limit position the wheels are in straight fore-and-aft position and when it is in its other limit position, the wheels are in angular position and when the wheels are in their latter position, the axes of the wheels intersect a common vertical axis internal to the vehicle.

* * * * *